3,359,215
HYDROCARBON REFORMING CATALYSTS
Ronald E. Reitmeier, Middletown, Ky., assignor to Catalysts and Chemicals, Inc., a corporation of Delaware
No Drawing. Filed Apr. 6, 1964, Ser. No. 357,800
5 Claims. (Cl. 252—459)

This invention pertains to the reforming of hydrocarbons, and particularly to novel catalysts therefor.

In gas-liquid contact processes such as hydrogenation, dehydrogenation, fractional distillation, gas scrubbing, and the like, great importance has been attached to increasing efficiency with throughput up to the flooding point. The flooding point is reached when the vapor velocity becomes high enough to pile up the descending liquid at some point in the column, causing the liquid to bubble. In gas-liquid contact processes the problem has been to provide means of liquid distribution which will avoid or reduce channeling and flooding while at the same time minimizing the pressure drop through the system.

Solutions of problems encountered in vapor-liquid contact systems have centered around the shapes of contacting surfaces or filling bodies within the towers. In 2,591,497 for instance the filling bodies were hollow tetrahedrons. In 2,867,425 circular filaments are shown. In 2,644,800 a serrated or grooved ring is disclosed, whereas in 1,796,501 a variety of shapes are described.

An analysis of the prior art reveals that whereas shape features have been the basis of many patents in the vapor-liquid contact art, differences in catalyst shapes in the hydrocarbon gas reforming field have been thought to affect only the pressure drop. In other words, catalytically, the forms can be rods, cylinders, spheres, spools, Raschig rings, etc. of various shapes, their purpose being to increase contact surface of a given amount of catalyst, and to improve the passage of vapor through the catalyst.

Since catalytic activity is deemed to be due to unsaturated or unsatisfied valence forces in atoms, and since these forces are believed to be greater near and at the surfaces, it has been considered necessary that the largest practicable surface area be maintained. Solid catalysts presenting the greatest surface area have, therefore, been preferred.

This invention, in one of its aspects, is concerned with the finding that, in the case of certain nickel reforming catalysts where the refractory is a hydraulic cement, the catalyst dimensions and proportions have an unexpected effect upon the catalyst activity. It has been found that a hydrocarbon reforming catalyst comprising definitely shaped, preformed particles of a nickel-hydraulic cement catalyst in the form of Raschig rings 3/8 inch in height and 5/8 inch in diameter with a 1/4 inch hole through the center, the amount of nickel, as metal, after reduction, being 26 to 28 weight percent according to this invention is the most active catalyst known today. This aspect of the invention is based on the discovery that whereas an expected increase in activity is obtained in going from a conventional 5/8 by 5/8 inch Raschig ring to a catalyst in the form of a 3/8 by 5/8 inch ring, an increase in catalyst activity beyond that due to the increase in surface area and bulking volume results in the case of a hydraulic cement catalyst which has a nickel content of 15 to 30 percent. The bulking volume means the volume occupied without compression beyond that due to the weight of the catalyst.

The invention thus pertains to a reforming catalyst medium comprising definitely shaped rings or hollow cylinders of a nickel impregnated hydraulic cement piled indiscriminately and of such size as to approximate optimum conditions of reforming activity comprising members 3/8 inch in height and 5/8 inch in diameter having a 1/4 inch hole through the center thereof, the amount of nickel as metal, after reduction, being 15 to 30 weight percent. A particularly active catalyst results when the nickel is in the 26 to 28 weight percent range.

Hydraulic cement as used herein includes both Portland cement and the calcium aluminates. In addition slaked lime or quick lime when mixed with water forms a mortar which has a cementing action. Portland cement includes Portland cement itself, blast furnace or slag cements, Portland cement clinker and the like composed primarily of calcium silicates. Calcium aluminate cements include the various calcium aluminate compounds such as calcium monoaluminate ($CaO \cdot Al_2O_3$), tricalcium aluminate ($3CaO \cdot Al_2O_3$), pentacalcium trialuminate $$(12CaO \cdot 7Al_2O_3)$$

and the like as well as cements such as the high alumina cements containing calcium aluminates. Desirable calcium aluminate cements are available commercially, for instance Lumnite, and CA-25 which is virtually a mixture of monocalcium aluminate and pentacalcium trialuminate (79 percent alumina, 18 percent lime and 3 percent other oxides). In impregnating the cement base a water soluble nickel salt is added to the hydraulic cement. This composition is then calcined to form a nickel oxide impregnated calcium silicate or calcium aluminate catalyst. The nickel salt can also be applied by dipping or spraying. In terms of nickel oxide the catalyst contains 33 to 37 percent nickel oxide and 67 to 63 percent calcium silicate or aluminate cement.

Use of the catalyst of this invention will permit the hydrogen manufacturer with an existing plant to increase his hydrogen production, or if the increased production cannot be marketed, the use of the catalyst of this invention will cut operating expense by allowing the same throughput rate with either a lower fuel input to the furnace, or a decreased steam to carbon ratio. Reforming conditions under which the catalysts of the invention are employed are well known. These conditions along with variously fired reformer furnaces can be used. Conversion temperatures of 1100° F. to 2000° F. are generally employed in reforming furnaces, and up to 2500° F. in adiabatic furnaces. Space velocities are generally 400 to 4000 volumes of gas under standard conditions of temperature and pressure per unit volume of catalyst per hour on a theoretical hydrogen basis. The pressure, of course, varies from plant to plant in the range of, say, atmospheric to 300 p.s.i.g. and higher.

As indicated, the steam hydrocarbon reforming catalysts contemplated herein are those well known reforming catalysts whose refractory base or support contains a hydraulic cement. The support will contain Portland cement, calcium aluminate cement, etc. entirely or the cement in combination with a kaolinitic clay as described in U.S. 3,001,953. Other hydraulic cements such as zirconium cement and magnesium cement can also be utilized to advantage.

The kaolinitic clay, if used in the compositions of this invention, is a material resulting from the natural weathering of feldspar and includes both primary kaolins such as china clay or secondary kaolins such as ball clay. Such clays are unique materials found in large quantities in nature. Kaolinitic clays are of a natural plastic nature having remarkably high uniformity in their properties and are composed of silicon, oxygen and hydrogen according to the general formula $$Al_2O_3 2SiO_2 2H_2O$$

They are sometimes referred to as comprising aluminum silicates but are probably composed of aluminosilicic acid.

In preparing the reforming catalysts of the invention nickel oxide is mixed with a cement slurry which is dried and, prior to curing, is granulated, mixed with a lubricant such as graphite and tableted into the rings of this invention. Commercially obtained nickel oxides are seldom suitable for use in reforming catalysts. Hence it is best to start with nickel carbonate. Nickel carbonate may be purchased, or it can be made by precipitating a solution of a soluble salt. For example nickel nitrate is reacted with a soluble carbonate salt, for example sodium carbonate or bicarbonate. Nickel carbonate can also be obtained by heating a nickel amine carbonate (180° F. to 212° F.). The carbonate is then converted to the catalytically usable nickel oxide by calcining at 800° F. to 1000° F.

That the activity of the catalyst of this invention is attributable to more than a size reduction is illustrated by the fact that the activity markedly increases at higher temperatures. This is shown by the following results (methane leakage) obtained at 1200° F., 1400° F. and 1600° F. using a calcium aluminate cement catalyst.

EXAMPLE 1

Catalysts of the following composition were prepared for loading into a commercial reforming furnace.

Ingredient: Weight percent
Calcium aluminate cement (CA-25) _____ 65.5
Nickel oxide _____ 20.0
Inerts (alumina) _____ 14.5

The three ingredients were dry mixed in a mix muller for fifteen minutes in sufficient quantities to make a 300 pound batch. With continued mixing sufficient water was then added over a five to ten minute period to form a heavy mud. As a lubricant two parts by weight of graphite were incorporated in the mud per 100 parts of ingredients (by weight), the wet mass being mixed for another five minutes. After this graphite addition the mass was removed from the mixer, spread out on trays in layers about two inches thick and allowed to dry at room temperature for approximately one hour. The dried material, containing fifteen to twenty percent moisture, was then granulated through an eight mesh screen. The granulated material was tableted into ⅝ x ⅝, ⅝ x ⅜ and ¾ x ¾ inch rings, each having a ¼ inch center hole, using a Stokes Ring Tableting Machine. After curing in closed drums for two days, the rings were placed in a steam autoclave at 60 pounds per square inch steam pressure for about six hours. The rings were calcined two hours at 400° F., two hours at 600° F. and six hours at 800° F.

A comparison of reforming activities of these three catalysts is given below.

*Reforming conditions*

Pressure: Atmospheric.
Space Velocity: 500 based on methane (equivalent to 2,000 theoretical $H_2$ space velocity).
Steam/Gas Ratio: 3/1.

|  | Methane Leakage (percent by volume) | | |
|---|---|---|---|
| Reforming Temperature, °F | 1,200 | 1,400 | 1,600 |
| Description Catalyst Rings: | | | |
| ¾" x ¾" | 7.8 | 2.0 | 1.0 |
| ⅝" x ⅝" | 6.1 | 1.4 | 0.4 |
| ⅝" x ⅜" | 6.4 | 0.9 | 0.2 |

As can be seen, at 1200° F. the ⅝" x ⅝" and ⅝" x ⅜" reforming catalysts compare favorably. However, at reforming temperatures of 1400° F. and 1600° F. the catalyst of the invention is superior, indicating that the increase in reforming activity is not linear in both instances.

In another of its aspects this invention is concerned with the fact that desirably not all of the nickel is added in the usual way. It has been found that the catalyst of this invention is further improved when about 90 to 99 percent of the nickel is compounded in catalyst preparation in the normal way and the remaining 1 to 10 percent is put on by subsequent dipping or spraying. The combination of the nickel application and the catalyst size confer on the catalyst its unusual properties. An additional feature of the catalyst is that it has never been heat treated at a temperature above the lowest temperature that would exist in a reforming furnace.

To show the improvement achieved by subsequent dipping the following example is given.

EXAMPLE 2

Using the ingredients and proportions set forth in Example 1 a catalyst identical to the ⅝" x ⅜" rings of Example 1 was made except that 1 percent of the nickel was applied by dipping the calcined rings in a soluble nickel salt solution. Under the reforming conditions set forth in Example 1 results are as follows.

|  | Methane Leakage (percent by volume) | | |
|---|---|---|---|
| Reforming Temperature, °F | 1,200 | 1,400 | 1,600 |
| Description Catalyst Rings: | | | |
| Undipped ⅝" x ⅜" (From Example 1) | 6.4 | 0.9 | 0.2 |
| Dipped ⅝" x ⅜" | 5.1 | 0.5 | 0.1 |

Thus a preferred method of preparing the catalysts of this invention is to mix a portion of the nickel, as nickel oxide, with the water-cement or water-cement-clay mix and to cure, calcine and tablet. The tableted, calcined catalyst is then dipped in or sprayed with a solution of a water soluble nickel salt, thereby impregnating the catalyst with the remaining nickel, say 1 to 10, preferably 2 to 5 percent, of the remaining total nickel salt on a weight basis, the total, as nickel oxide, being 40 to 45 percent. It should be noted, however, that nickel nitrate reacts with calcium aluminates. Hence if this preferred method is employed with calcium aluminates, the nickel aminecarbonate solution is used. In this case only the remaining 1 to 2 percent of the nickel salt will be added by subsequently dipping or spraying because only dilute aqueous solutions, those containing less than 10 percent of the nickel aminecarbonate can be made.

A desirable catalyst which can be formed according to this invention is the catalyst described in U.S. 3,001,953 prepared as follows.

*Illustration A*

A conventional catalyst was prepared as follows: 184 parts by weight of nickel powder was dissolved in nitric acid. The resulting nickel nitrate solution was diluted with water and an aqueous sodium carbonate solution (containing 384 parts by weight of sodium carbonate in about 3500 parts by weight of water), was added. The precipitate was filtered, and the filter cake washed with water at about 40° C. and dried.

A third of the filter cake was then mixed in a Simpson Mix Muller with about 178 parts by weight of Kentucky ball clay, 76 parts by weight of magnesium oxide and an aqueous nickel nitrate solution containing about 36 parts by weight of nickel as a 15 percent solution. The resulting mud was then calcined for about 7 hours at about 900° F. which converted the nickel salts to nickel oxide. About 50 parts by weight of the powder was mixed with about 15 parts by weight of hydraulic cement and about 25 parts by weight of water. This material was allowed to air dry for about 12 hours and was then granulated through a 12 mesh screen. Three percent graphite was added and the material was tableted into rings. The rings were stacked and sprinkled with water twice daily for 3 days. The rings were then calcined at a temperature of 1200° F. to 1600° F. for 6 hours. The side crush strength of the finished catalyst averaged about 45 pounds.

The following example and data show the unexpected increase in activity of catalysts of Illustration A tableted according to the practice of this invention. In the examples percentages of solid ingredients are on a weight basis.

EXAMPLE 3

According to foregoing Illustration A catalysts were prepared having the composition set forth below, except that 3 percent (by weight based on metal) of the nickel was added subsequently by dipping the catalyst in nickel nitrate prior to activation. The catalysts were tableted into the 5/8" x 3/8" ring of the invention and into 5/8" x 5/8" rings each having a 1/4" center hole. Activation temperatures, reforming conditions and activities of the dipped catalysts are shown in the table.

Basic catalyst composition

| | Percent |
|---|---|
| Magnesium Oxide | 9.5 |
| Kentucky Ball Clay | 35.5 |
| Nickel Oxide | 32.8 |
| Portland Cement | 22.2 |

Reforming conditions

Pressure: Atmospheric.
Space Velocity: 500 based on methane (equivalent to 2,000 theoretical H₂ space velocity).
Steam/Gas Ratio: 3/1.
Temperature: 1,400° F.; 1,600° F.

| Catalyst | Description Catalyst Rings | Activation Temperature, °F. | Methane Leakage (percent by volume) | |
|---|---|---|---|---|
| | | | 1,400° F.* | 1,600° F.* |
| 1 | 5/8" x 5/8" | 1,200 | 2.3 | 0.5 |
| 2 | 3/8" x 5/8" | 1,100 | 0.2 | negligible |

*Reforming temperature.

The foregoing example shows that the catalyst of this invention is far superior to the identical catalyst tableted in the 5/8" x 5/8" inch ring. Referring to the relative activities, it is seen that using the catalyst of this invention the methane leakage dropped from 2.3 percent to 0.2 percent. Based only on the increased surface area, the expected methane leakage in so reducing the catalyst size would be about 1.2 percent rather than 0.2. At 1600° F. the methane leakage is also lower than would be expected due to the increase in surface area and bulking volume.

EXAMPLE 4

Catalysts having the same compositions as those in Example 3 but prepared as set forth in Illustration A without the dipping procedure were used under the following conditions.

Basic catalyst composition

| | Percent |
|---|---|
| Magnesium Oxide | 9.5 |
| Kentucky Ball Clay | 35.5 |
| Nickel Oxide | 32.8 |
| Portland Cement | 22.2 |

Reforming conditions

Pressure: Atmospheric.
Space Velocity: 500 based on methane (equivalent of 2,000 theoretical H₂ space velocity).
Steam/Gas Ratio: 3/1.
Temperature: 1400° F.

The results of reforming varied according to the size of the catalyst as follows:

| Catalyst | Description Catalyst Rings | Activation Temperature, °F. | Methane Leakage (percent by volume), Reforming Temperature, 1,400° F. |
|---|---|---|---|
| 3 | 3/4" x 3/4" | 1,400 | 13.0 |
| 4 | 5/8" x 5/8" | 1,400 | 3.9 |
| 5 | 5/8" x 3/8" | 1,400 | 2.5 |

Here again the catalyst of this invention is more active. The methane leakage expected on the basis of size alone would be 3.0 percent at 1400° F.

The nickel oxide in the catalysts of the invention, prior to activation, depends upon whether a high or a low nickel content catalyst is desired. Reforming catalysts generally contain 15 to 35 percent by weight nickel (as metal). This means that 20 to 45 weight percent nickel oxide will be mixed with the 80 to 55 weight percent cement or cement and clay.

EXAMPLE 5

The following data from commercial installations using various catalysts under identical conditions are given to show the use of various nickel oxide content catalysts.

| Catalyst | Nickel Oxide Content (wt. percent) | Size and Shape¹ | Side Crush Strength in Pounds of Dead-Weight Load (lbs.) | Relative Pressure Drop Based on Particle Size | Maximum Operating Temp. (°F.) | Reaction Initiation Temp. for Methane² (°F.) | Relative Activity Based on Throughput |
|---|---|---|---|---|---|---|---|
| 6a | 22-25 | 1/2" x 1/2" Tabs | 150-200 | 2.07 | 1,850 | 1,200 | 0.69 |
| 6b | 22-25 | 3/4" x 3/4" Tabs | >200 | 1.19 | 1,850 | 1,200 | 0.45 |
| 6c | 22-25 | 5/8" x 5/8" Rings | 80-120 | 1.00 | 1,850 | 1,200 | 0.67 |
| 6d | 22-25 | 3/4" x 3/4" Rings | >200 | 0.85 | 1,850 | 1,200 | 0.54 |
| 6e | 22-25 | 1" x 0.6" Rings | >200 | 0.56 | 1,850 | 1,200 | 0.43 |
| 7a | 32-35 | 1/2" x 1/2" Tabs | 150-200 | 2.07 | 1,850 | 1,200 | 1.04 |
| 7b | 32-35 | 3/4" x 3/4" Tabs | >200 | 1.19 | 1,850 | 1,200 | 0.68 |
| 7c | 32-35 | 5/8" x 5/8" Rings | 80-120 | 1.00 | 1,850 | 1,200 | 1.00 |
| 7d | 32-35 | 3/4" x 3/4" Rings | >200 | 0.85 | 1,850 | 1,200 | 0.81 |
| 7e | 32-35 | 1" x 0.6" Rings | >200 | 0.56 | 1,850 | 1,200 | 0.64 |
| 8a | 23-26 | 1/2" x 1/2" Tabs | 150-200 | 2.07 | 2,300 | 1,200 | 1.04 |
| 8b | 23-26 | 3/4" x 3/4" Tabs | >200 | 1.19 | 2,300 | 1,200 | 0.68 |
| 8c | 23-26 | 5/8" x 5/8" Rings | 80-120 | 1.00 | 2,300 | 1,200 | 1.00 |
| 8d | 23-26 | 3/4" x 3/4" Rings | >200 | 0.85 | 2,300 | 1,200 | 0.81 |
| 8e | 23-26 | 1" x 0.6" Rings | >200 | 0.56 | 2,300 | 1,200 | 0.64 |
| 9a | 18-21 | 1/2" x 1/2" Tabs | 150-200 | 2.07 | 2,300 | 1,200 | 1.04 |
| 9b | 18-21 | 3/4" x 3/4" Tabs | >200 | 1.19 | 2,300 | 1,200 | 0.68 |
| 9c | 18-21 | 5/8" x 5/8" Rings | 80-120 | 1.00 | 2,300 | 1,200 | 1.00 |
| 9d | 18-21 | 3/4" x 3/4" Rings | >200 | 0.85 | 2,300 | 1,200 | 0.81 |
| 9e | 18-21 | 1" x 0.6" Rings | >200 | 0.56 | 2,300 | 1,200 | 0.64 |
| 10 | 36-39 | 5/8" x 3/8" Rings | 60-80 | 1.22 | 1,850 | 1,100 | 1.24 |

¹ Nominal hole sizes for the various sizes of rings are as follows: 1/4" hole for 5/8" and 3/4" rings; 3/8" hole for 1" rings.
² Temperatures listed are for catalysts in the oxidized state. After these catalysts are reduced, they will undoubtedly initiate reforming at lower temperatures.

Catalyst 6: 23%-25% NiO; 35%-40% Ky. ball clay; 15%-20% MgO; and 20%-25% ground Portland cement clinkers.
Catalyst 7: 33%-37% NiO; 25%-30% Ky. ball clay; 10%-15% MgO and 20%-25% Portland cement.
Catalyst 8: 23%-26% NiO; 45% calcium aluminate; and remainder alumina.
Catalyst 9: 18%-21% NiO; 45% calcium aluminate; and remainder alumina.
Catalyst 10: 25%-30% NiO; and 75%-70% calcium aluminate.

EXAMPLE 6

Identical commercial steam-hydrocarbon reforming plants were operated using the catalyst of this invention and a commercially available catalyst whose exact composition is not known but which is known to have approximately the same activity as Catalyst 10. The catalyst of the invention (Catalyst A), prepared as set forth in Illustration A, contained 25 to 35 percent NiO, Kentucky ball clay, and Portland cement. The purchased catalyst (Catalyst B) is believed to have a lower nickel content (20 to 25 percent NiO). Reforming runs were carried out over each catalyst as follows:

|  | A | B |
|---|---|---|
| Tube (skin) temp., °F | 1,750 | 1,800 |
| Theor. $H_2$ SV | 2,110 | 2,110 |
| Feed Rate, std. cu. ft. $CH_4$ hr | 134,000 | 134,000 |
| Catalyst vol., cu. ft | 254.9 | 254.9 |
| $CH_4$ leakage, mol percent | 0.19 | 0.51 |

A high feed rate, together with low skin temperature, small catalyst volume, and the minimum methane leakage indicate the efficiency of a reforming operation. Theoretical hydrogen space velocity (theor. $H_2$ SV) refers to the standard cubic feet of hydrogen produced per hour per cubic foot of catalyst, assuming complete reaction of the hydrocarbon with steam to produce carbon dioxide and hydrogen. With the same feed rate, same amount of catalyst and a 50° F. lower skin temperature, the 5/8″ by 3/8″ catalyst gives a methane leakage 30% lower than that of the 5/8″ by 5/8″ catalyst. This is an outstanding example of the higher efficiency of the smaller size catalyst as compared with the larger sized catalyst.

EXAMPLE 7

Reforming furnaces containing Catalysts A and B described in Example 6 were operated at temperatures of 1500° F. to 1600° F. as follows:

|  | A | B |
|---|---|---|
| Tube (skin) temp., °F | 1,555 | 1,550 |
| Theor. $H_2$ SV | 2,710 | 2,288 |
| Feed Rate, std. cu. ft. $CH_4$ hr | 176,000 | 149,000 |
| Catalyst vol., cu. ft | 260 | 260 |
| $CH_4$ leakage, mol percent | 6.81 | 7.35 |

With the same temperature and catalyst volume, the Catalyst A processes 18% more feed gas than the 5/8″ Catalyst B while giving a lower methane leakage—6.81 versus 7.35 mol percent.

The foregoing examples and tables show that the catalyst of this invention is a highly active reforming catalyst. The examples also illustrate that the hydraulic cement catalyst base can be either a calcium silicate or a calcium aluminate base. The examples also illustrate that a very active catalyst can be made by using all but about 1 to 10 percent (based on nickel oxide) of the nickel salt and impregnating the calcined catalyst therewith after preparation. Other modifications and variations will occur to one skilled in the art. As an example the calcining temperatures of the catalysts contemplated herein desirably will depend upon the cement which is impregnated. As the examples show a calcium aluminate cement catalyst preferably is calcined at temperatures of about 800° F. whereas a calcining temperature of 1200° F. to 1600° F. is used in the case of Kentucky ball clay. As another example a metal oxide such as magnesia in a concentration of about 4 to 15 percent by weight of the total composite can be used. Other promoters, such as chromium oxide or aluminum oxide can also be used to promote the nickel. This class of promoters should not exceed about 5 percent by weight of the total catalyst composite and as little as 1 percent by weight has been found effective. As indicated in U.S. 3,001,953, the kaolinitic clay should constitute at least 20 percent by weight of the finished catalysts and may constitute as much as 80 percent by weight. The hydraulic cement preferably is utilized in a concentration of between 20 and 30 percent by weight of the finished catalyst; however, as little as 12 percent by weight may be utilized with favorable results, especially if it is desired to produce a catalyst containing a high concentration of nickel. These and other such ramifications are deemed to be within the scope of this invention.

What is claimed is:

1. A hydrocarbon reforming catalyst comprising definitely shaped particles of a nickel-hydraulic cement catalyst in the form of Raschig rings 3/8 inch in height and 5/8 inch in diameter with a 1/4 inch hole through the center, the amount of nickel as metal being 15 to 30 weight percent.

2. A reforming catalyst medium comprising definitely shaped hollow cylinders of a nickel impregnated hydraulic cement piled indiscriminately and of such size as to approximate optimum conditions of reforming activity comprising members 3/8 inch in height and 5/8 inch in diameter having a 1/4 inch hole through the center thereof, the amount of nickel as metal being 25 to 30 weight percent.

3. A hydrocarbon reforming catalyst comprising definitely shaped particles of a nickel impregnated hydraulic cement refractory base in the form of Raschig rings 3/8 inch in height and 5/8 inch in diameter with a 1/4 inch hole through the center, the amount of nickel as metal being 15 to 30 weight percent, 1 to 10 percent of the nickel being coated on the catalyst subsequent to calcination.

4. A hydrocarbon reforming catalyst comprising definitely shaped particles of a nickel impregnated hydraulic cement refractory base in the form of Raschig rings 3/8 inch in height and 5/8 inch in diameter with a 1/4 inch hole through the center, the amount of nickel as metal being 26 to 28 percent, the refractory base comprising 20 to 30 weight percent hydraulic cement and at least 20 percent kaolinitic clay.

5. A hydrocarbon reforming catalyst comprising definitely shaped particles of a nickel impregnated hydraulic cement refractory base in the form of Raschig rings 3/8 inch in height and 5/8 inch in diameter with a 1/4 inch hole through the center, the amount of nickel as metal being 15 to 30 weight percent, 2 to 5 percent of the nickel within said range being coated on the catalyst subsequent to its preparation and calcination, the said catalyst being calcined at a temperature below 1100° F.

References Cited

UNITED STATES PATENTS

| | | | |
|---|---|---|---|
| 1,970,695 | 8/1934 | Freyermuth | 252—459 X |
| 3,027,237 | 3/1962 | McMullan | 23—212 X |
| 3,106,457 | 10/1963 | Lockerbie et al. | 23—212 |
| 3,116,116 | 12/1963 | Breault | 23—212 |
| 3,162,606 | 12/1964 | Giraitis et al. | 252—459 X |
| 3,186,797 | 6/1965 | Pearce et al. | 252—459 X |
| 3,256,207 | 6/1966 | Arnold | 23—212 X |
| 2,038,566 | 4/1936 | Huettner | 252—466 X |

MILTON WEISSMAN, *Primary Examiner.*

EDWARD STERN, *Examiner.*